US007857206B2

(12) United States Patent
Gunst et al.

(10) Patent No.: US 7,857,206 B2
(45) Date of Patent: Dec. 28, 2010

(54) FINANCIAL TRANSACTIONS PROCESSING SYSTEM INCLUDING CASH DISPENSER OR RECYCLER

(75) Inventors: Robert Edward Gunst, Neosho, WI (US); John W. Smith, Woodridge, IL (US); Philip Michael William Ireland, Hampshire (GB)

(73) Assignee: Talaris Holdings Limited, London (GB)

( * ) Notice: Subject to any disclaimer, the term of this patent is extended or adjusted under 35 U.S.C. 154(b) by 964 days.

(21) Appl. No.: 11/715,344

(22) Filed: Mar. 8, 2007

(65) Prior Publication Data

US 2007/0158407 A1 Jul. 12, 2007

Related U.S. Application Data

(62) Division of application No. 11/157,798, filed on Jun. 22, 2005, now Pat. No. 7,350,699.

(51) Int. Cl.
*G06K 5/00* (2006.01)
*G07F 19/00* (2006.01)

(52) U.S. Cl. ....................................... 235/379; 235/380

(58) Field of Classification Search ................. 235/379, 235/380, 382, 375, 383, 475, 476
See application file for complete search history.

(56) References Cited

U.S. PATENT DOCUMENTS

| | | | | |
|---|---|---|---|---|
| 4,439,083 | A | 3/1984 | Jenkins et al. | |
| 4,766,292 | A * | 8/1988 | Cone | 235/22 |
| 5,020,787 | A * | 6/1991 | Arikawa | 271/3.19 |
| 5,199,697 | A * | 4/1993 | Yamada et al. | 271/122 |
| 5,351,856 | A * | 10/1994 | Laidlaw | 221/131 |
| 5,975,273 | A | 11/1999 | Zwahlen et al. | |
| 5,984,177 | A | 11/1999 | Do et al. | |
| 6,006,989 | A | 12/1999 | Ademmer et al. | |
| 6,315,279 | B1 | 11/2001 | Minamishin et al. | |
| 6,373,209 | B1 | 4/2002 | Gerber et al. | |
| 6,557,849 | B2 | 5/2003 | Wyss | |
| 6,578,695 | B1 | 6/2003 | Blaser et al. | |
| 6,581,746 | B1 | 6/2003 | Lunblad | |
| 6,637,647 | B2 | 10/2003 | Katou et al. | |
| 6,681,985 | B1 | 1/2004 | Curtin et al. | |
| 6,715,735 | B2 | 4/2004 | Bligh et al. | |
| 6,726,096 | B1 * | 4/2004 | Green et al. | 235/379 |
| 2005/0011721 | A1 | 1/2005 | Armanini et al. | |
| 2007/0034683 | A1 * | 2/2007 | Eastman et al. | 235/379 |
| 2007/0158407 | A1 * | 7/2007 | Gunst et al. | 235/379 |
| 2008/0056761 | A1 * | 3/2008 | Kawahara et al. | 399/110 |

OTHER PUBLICATIONS

De La Rue Cash Systems GMBH and Plan Object GMBH, "Dialog Banking in der Praxis," Mörfelden—Walldorf, Feb. 1999.

* cited by examiner

*Primary Examiner*—Thien M Le
(74) *Attorney, Agent, or Firm*—Oliff & Berridge, PLC

(57) ABSTRACT

A financial transactions processing system includes a cradle to receive dispensed notes for dispensing cash to customers and/or tellers. The cradle may be rotatable for use with more than one user. The cradle may have end walls to provide security and privacy to each user. A rotatable shield may provide additional security and privacy. A lock may prevent the cradle and/or shield from rotating to prevent unauthorized access to cash in the cradle.

17 Claims, 12 Drawing Sheets

FINANCIAL TRANSACTIONS PROCESSING SYSTEM INCLUDING CASH DISPENSER OR RECYCLER

This is a Division of application Ser. No. 11/157,798 filed Jun. 22, 2005 now U.S. Pat. No. 7,350,699. The disclosure of the prior application is hereby incorporated by reference herein in its entirety.

BACKGROUND

The invention relates to financial transactions processing systems and methods, which can be provided, for example, in banks and other financial institutions or environments.

A typical bank branch office, for example, includes a teller counter having one or more teller stations. The teller counter typically separates the branch office into a teller area on one side of the counter, and a customer area on the other side of the counter. In some banks, an additional transparent partition is located above the counter to further separate the teller area from the customer area. Many bank branch offices also include various devices to assist the teller in servicing customers.

For example, U.S. Pat. No. 6,726,096 discloses an automated banking machine for carrying out banking transactions. This automated banking machine can dispense coins and notes.

U.S. Pat. No. 6,681,985 discloses a financial transaction processing system to process financial transactions for a customer in a financial institution. A concierge may direct the customer to a stand-alone podium (sometimes called a tower) containing a teller computer, cash slot, and cash box. A bank employee at the tower performs transactions for the customer. In an embodiment, a teller cash dispenser dispenses cash to the customer.

U.S. Pat. No. 6,315,279 discloses a paper money processing apparatus having separate note dispensing and note receiving sections that are detachably connected to each other.

U.S. Pat. No. 5,984,177 discloses a device that may be configured for front and rear service.

U.S. Pat. No. 6,578,695 discloses a device that has cash handling equipment using a common back plate and interchangeable modules.

U.S. Pat. No. 6,637,647 discloses a bill transaction machine. The machine includes a plurality of detachably mounted boxes for accepting bills. The machine may be dedicated to deposit, withdrawal, or both.

U.S. Pat. No. 6,006,989, U.S. Pat. No. 5,975,273, and U.S. Pat. No. 6,581,746 each disclose cash handling devices having cassettes for storage and retrieval of cash.

U.S. Pat. No. 6,726,096 discloses a teller machine having two interfaces sharing the same storage of cash, in which a robotic arm interfaces with several customers at several positions with a central machine.

A more recent trend in the banking industry is to provide stand-alone podiums containing one or two teller stations, around which tellers and customers can move. Examples of such stand-alone podiums/towers are provided in, for example, U.S. Pat. No. 6,681,985, the disclosure of which is incorporated herein by reference in its entirety. Also see De La Rue Cash Systems GMBH and Plan Object GMBH, "Dialog Banking in der Praxis", Mörfelden-Walldorf, February, 1999.

SUMMARY

Many financial institutions use a combination of the above described or other teller devices. In order to more effectively provide financial services, a financial transactions processing system according to some aspects of the invention, includes a teller station having a teller computer and a cash recycler link to the teller computer. The cash recycler may have an input receptacle and an output dispenser. The input receptacle may receive notes to be counted and stored by the recycler. The output dispenser may dispense notes from the recycler directly to a customer.

In an exemplary embodiment, a cash dispenser may include an outlet to receive dispensed notes with a cradle disposed in the outlet. The cradle may have two spaced apart walls defining a passage arranged to dispense the notes. The cradle may further have a first end and a second end, each of which provide a barrier to the notes in the passage. The cradle may be rotatable about a rotational-axis, and the rotation of the cradle in a first direction may allow the first end of the cradle to provide a barrier of the notes in the passage to prevent a second user from viewing or accessing the notes in the passage via the first end of the passage. Furthermore, the rotation of the cradle in a second direction may allow the second end of the cradle to provide a barrier of the notes in the passage to prevent a first user from viewing or accessing the notes in the passage via the second end of the passage.

In another exemplary embodiment, the cash dispenser may include a housing with a cradle protruding from the housing, the cradle may have two spaced apart walls defining a passage arranged to receive dispensed notes, wherein the cradle is rotatable about a rotational axis so as to selectively receive dispensed notes in one of a first direction and a second direction. A cover may be disposed over the cradle. The cover may be movable at least between first and second positions based on whether the cradle is receiving dispensed notes in the first direction or in the second direction.

In another exemplary embodiment, the cash dispenser may have the cradle with two spaced apart walls defining the passage arranged to receive dispensed notes, wherein the cradle is rotatable about a rotational-axis. The cash dispenser may also include a lock to prevent rotation of the cradle about the rotational-axis.

In yet another exemplary embodiment, the cash dispenser may include a rotatable cash-dispensing cradle that rotates about a rotational axis in one of a first direction when located at a first rotational position, and a second direction when located at a second rotational position. The cash dispenser may also include security means for inhibiting access to the cradle from the second direction when the cradle is located at the first rotational position, and for inhibiting access to the cradle from the first direction when the cradle is located at the second rotational position.

DETAILED DESCRIPTION OF EMBODIMENTS

In order to more effectively provide financial services, a financial transactions processing system according to some aspects of the invention, includes a device incorporating a cash dispenser or recycler in a single housing that may be used in teller service devices.

According to exemplary embodiments, the system may be incorporated into a number of different settings. For example, the financial transaction processing system according to some embodiments of the invention can be provided at an in-line teller counter or at a stand-alone podium. The in-line teller counter and the stand-alone podium can include a cash-dispensing machine such as, for example, a teller cash dispenser (which includes a store of cash which can be dispensed to either the teller or directly to the customer); or a teller cash recycler, which is capable of receiving currency (e.g., during a deposit transaction) and then, after confirming the authenticity of that currency, dispensing that currency (e.g., during a withdrawal transaction) to the teller or directly to the customer.

The cash-dispensing machine or recycler may have a shield to provide security and privacy at a cash inlet/outlet of the machine.

The podium or the in-line teller counter with the cash-dispensing machine or cash recycler may be laid-out in the bank to facilitate eye contact between the teller and customer.

The podium or the in-line teller counter may be configured so that it is operable from a front or rear side.

The processing system may allow for two customers to be serviced with only one cash-dispensing machine or recycler.

In an exemplary embodiment, at least two interfaces share the same storage of cash.

In an exemplary embodiment, a cash inlet/outlet of the machine may be shared by more than one customer station and/or more than one teller station.

In an exemplary embodiment, the machine may sort and store checks, cash, deposit slips, signed receipts and the like.

Exemplary embodiments will now be described with reference to the accompanying drawings. These embodiments, however, are exemplary only, and are not intended to limit the invention.

Figure 1:
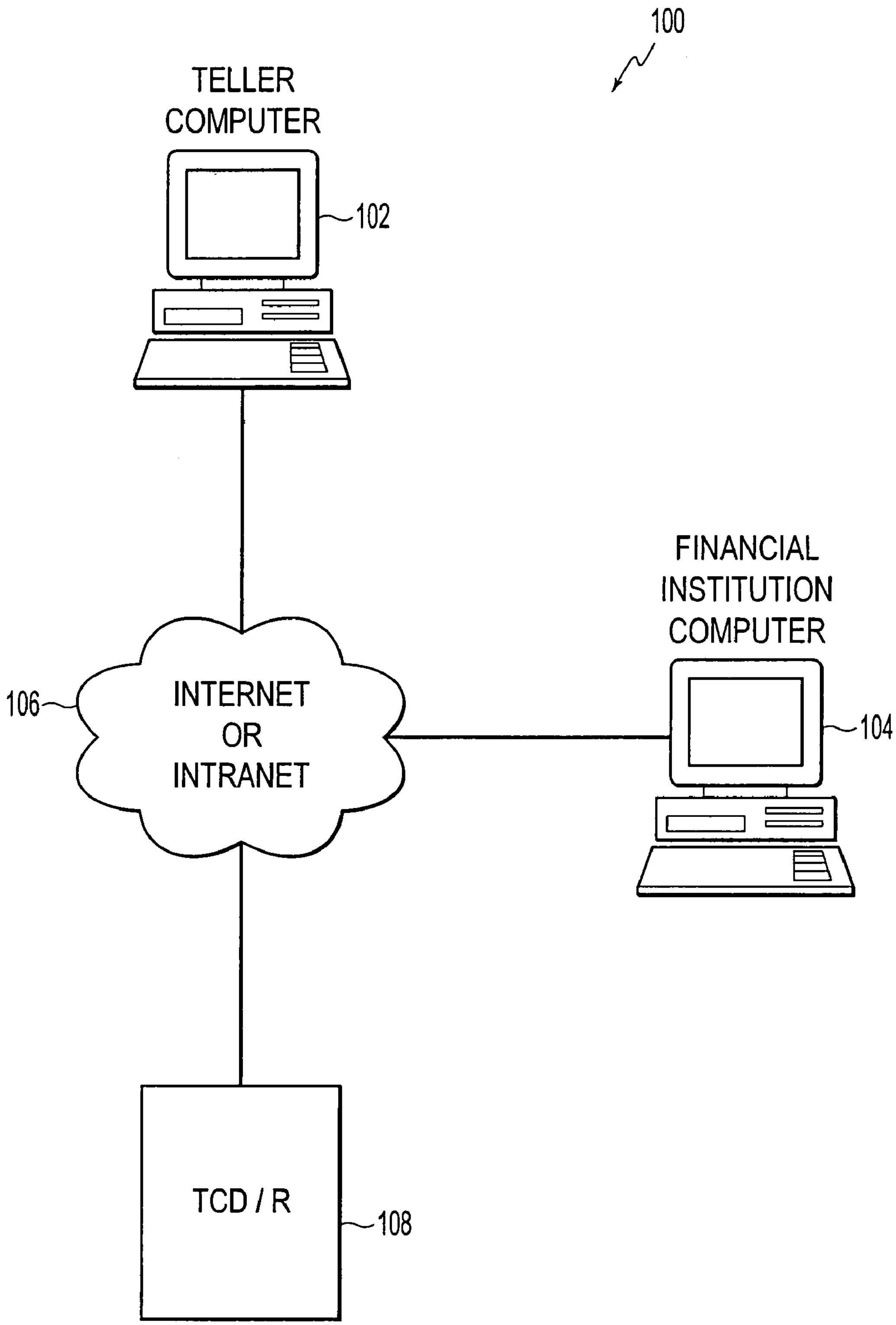
FIG. 1 is a block diagram of a financial transactions processing system according to in exemplary embodiment.

In accordance with the exemplary embodiments, a financial transactions processing system according to some aspects of the invention includes a teller station having a single device that may provide teller services. As shown in FIG. 1, a teller station 100 includes a teller computer 102 that can be linked to a financial institution computer 104 over a communications system 106 such as an intranet or the Internet. The teller computer 102 can be, for example, a personal computer running appropriate banking software. One example of appropriate banking software is Teller Cash Connect, available from De La Rue Cash Systems of Lisle, Ill. The teller station 100 also includes a cash dispenser or a cash recycler linked to the teller computer 102 and/or the financial institution computer 104 over the communications system 106. In the embodiment of FIG. 1, the teller station includes a cash recycler 108.

The cash dispenser, or teller cash dispenser (TCD), is a machine that includes a plurality of bill storage cartridges that dispense currency bills to the teller, or directly to the customer, based upon input signals provided by the teller through the teller's computer. One example of a teller cash dispenser is the TCD 2000, Model 50, Model 30, etc. or the Benchmark Series® 7 teller cash dispensing system, all provided by De La Rue Cash Systems of Lisle, Ill. A TCD does not have the capability of counting money that is deposited, but may include a secure drop box into which bundles of cash, for example (perhaps placed in a marked envelope), can be inserted.

As an alternative to a TCD, the cash recycler or teller cash recycler (TCR) can be provided. A TCR is similar to a TCD, except that the TCR also has an input bin into which a stack of currency bills can be placed, and hardware and software for feeding the bills from that input bin, scanning the bills to determine their denomination and/or authenticity (by using, for example, one or more of optical, magnetic and UV sensing techniques well known in the art) and then feeding denominated and/or authenticated notes to the currency storage cartridges. The notes then can be re-dispensed from the currency storage cartridges. Thus, when a TCR is provided, the currency bill storage cartridges must be capable of receiving bills and then re-dispensing such bills. For a TCR, the currency bill storage cartridges typically are roll storage modules (RSM), whereas a TCD, which only needs to dispense currency bills, can use other types of bill storage cartridges, for example, which store the bills in a stack. Some examples are shown in, for example: U.S. Pat. No. 6,373,209, U.S. Pat. No. 6,715,735, U.S. Pat. No. 6,557,849 and U.S. Patent Publication No. 2005/0011721A1, the disclosures of which are incorporated herein by reference in their entireties.

The nomenclature TCD/R is meant to signify that the machine could be a TCD or a TCR.

Figure 2:
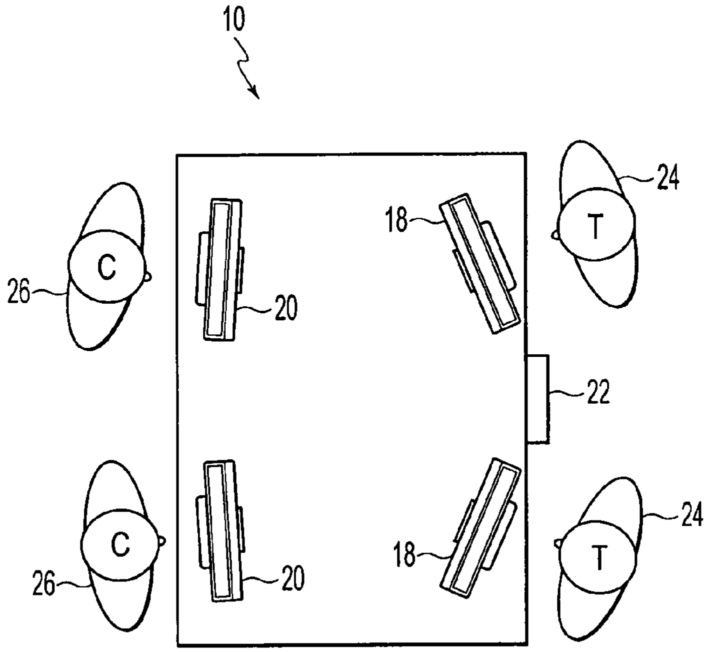
FIG. 2 is a top view of a dual station cash dispensing/recycling machine that dispenses to the tellers in an exemplary embodiment.

Referring to FIG. 2, the machine 10 may be a teller device wherein a teller 24 transfers notes and/or coins to a customer 26. The machine 10 may have a teller display 18, a customer display 20, and a cash input/output device 22. In this mode, the cash input/output device 22 may be accessible only to the teller 24, such that the teller 24 transfers notes and/or coins directly to the customer 26. The machine 10 may include more than one teller display and more than one customer display so that a plurality of tellers may service a corresponding plurality of customers. In the embodiment of FIG. 2, two tellers 24, each with a teller display 18, may separately service two customers 26, each with a customer display 20, while sharing the same cash input/output device 22. If the machine 10 is a TCD, it will only dispense cash, but can include a drop box for receiving deposits (thus, the machine would be like a typical automated teller machine (ATM)). If the machine 10 is a TCR, it could receive, count, authenticate and store deposited notes, as well as dispense notes.

Figure 3:
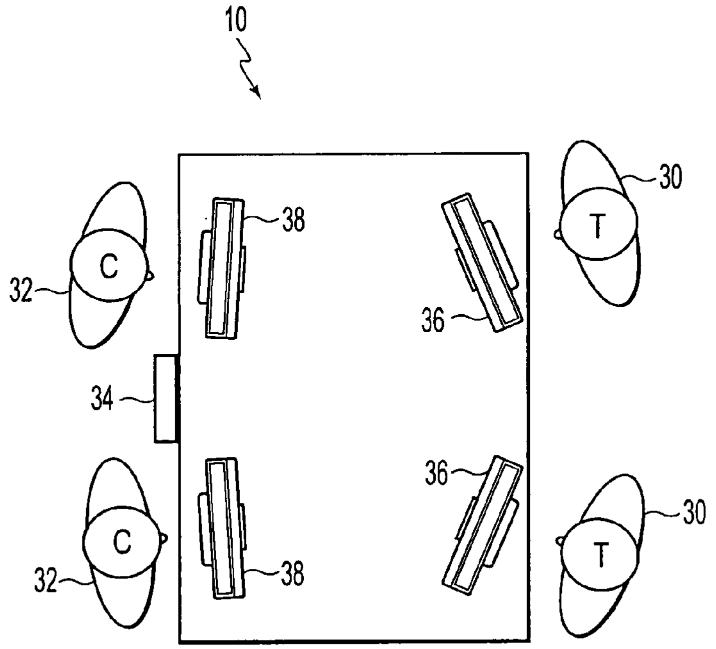
FIG. 3 is a top view of a dual station cash dispensing/recycling machine that dispenses to the customers in an exemplary embodiment.

Referring to FIG. 3, the machine 10 may be a teller device wherein the machine 10 dispenses notes and/or coins directly to a customer 32 via an input/out device 34, and the customer 32 may deposit notes and/or coins, or the like into the input/output device 34. The operation of the device is controlled by the teller 30, like the FIG. 2 device. The machine 10 may include more than one teller display and more than one customer display so that a plurality of tellers may service a corresponding plurality of customers. In the embodiment of FIG. 3, two tellers 30 each with a teller display 36 may separately service two customers 32, each with a customer display 38, while the customers 32 share the same cash input/output device 34.

In order to share the same cash input/output device, as described above with respect to FIGS. 2 and 3, the input/output device may be configured so that only one customer or teller at a time may deposit or withdraw cash to/from the device. Additional privacy and security measures may be provided at the input/output device, as discussed more fully below.

The machine may be configured for use with an in-line counter. In-line teller counters in which embodiments of the invention are implemented are described in connection with FIGS. 4 and 5.

As is common in many banks, when an in-line teller counter 200 is provided, the bank area is separated into a teller area 210 and a customer area 220. Many such teller counters include a partition 208, which can be made of bulletproof glass, to further separate the teller area 210 from the customer area 220.

Figure 4:
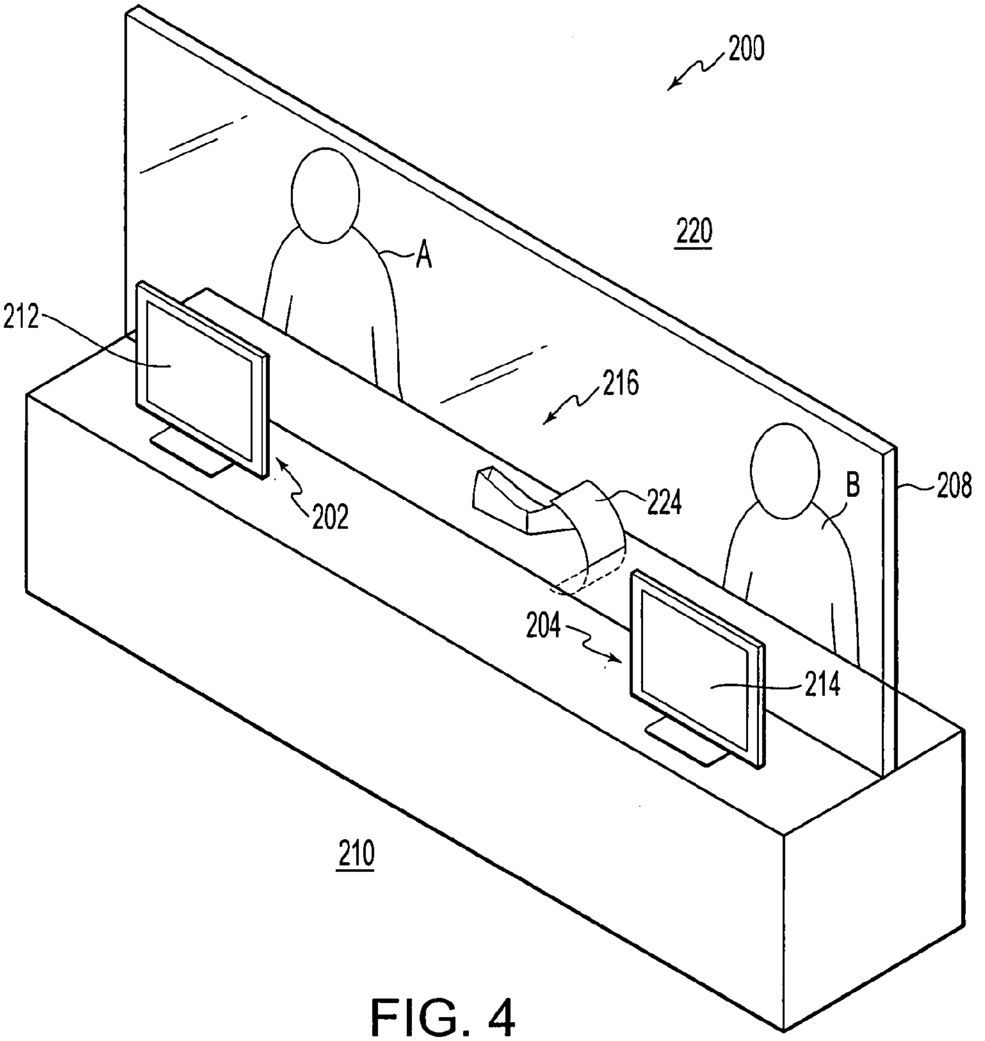
FIG. 4 is a perspective view of an in-line counter containing a partition, teller stations and cash dispensing/recycling machine in an exemplary embodiment that dispenses directly to customers.
Figure 5:
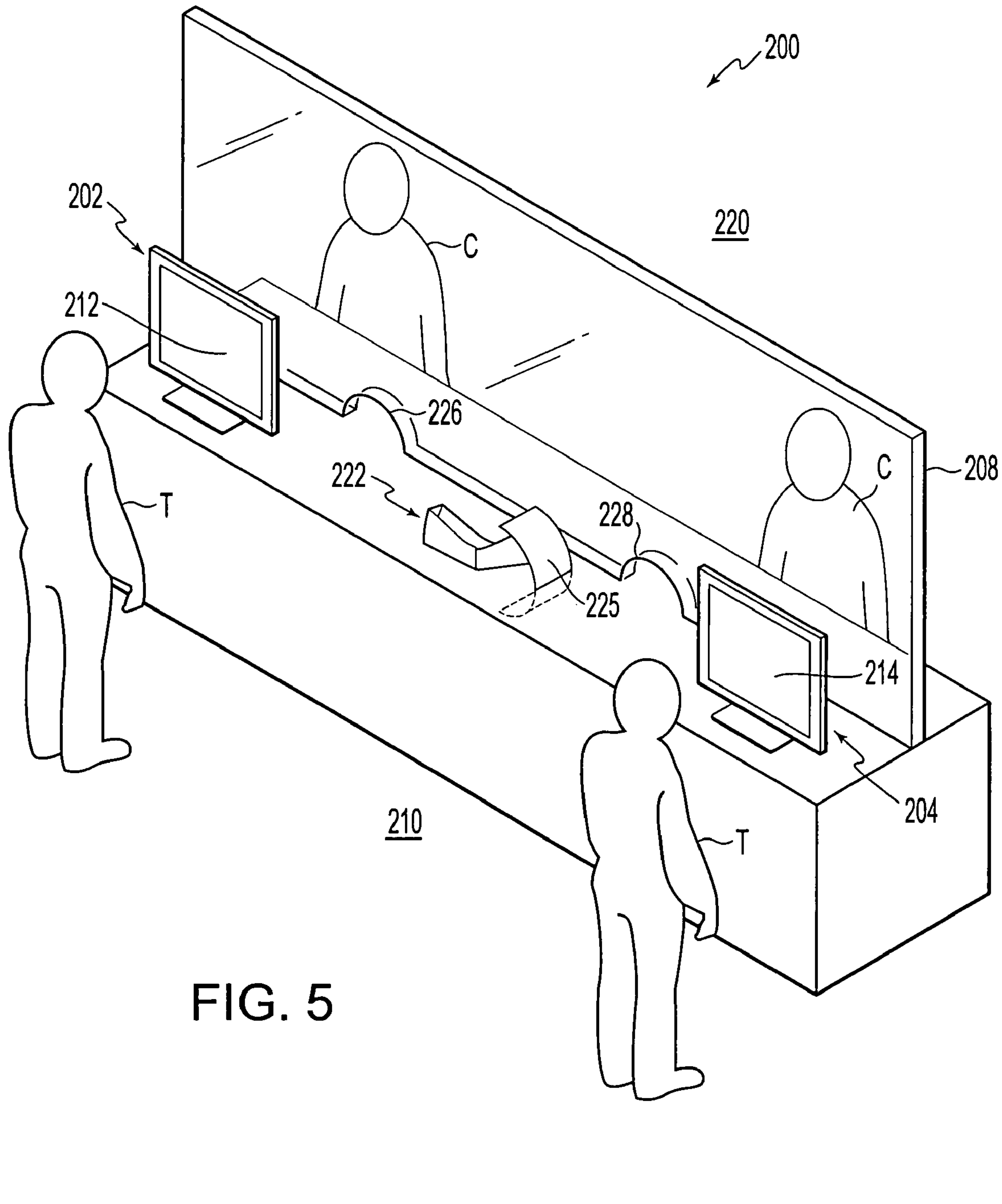
FIG. 5 is a perspective view of an in-line counter containing a partition, teller stations and cash dispensing/recycling machine in an exemplary embodiment that dispenses directly to tellers.

The in-line teller counter 200 of FIGS. 4 and 5 includes the two teller stations 202, 204. Each teller station 202, 204 includes a teller display 212, 214, respectively. These teller displays 212, 214 are commonly provided in the banking environment, and each is coupled to its own teller computer (not shown in FIG. 4 or 5), which, in turn, is coupled to a bank computer (also not shown in FIG. 4 or 5).

Referring to FIGS. 4 and 5, the in-line teller counter 200 may include one or more teller cash dispensing machines. FIG. 4 is a perspective view of an in-line teller counter 200 having, for example, two teller stations 202, 204. In the FIG. 4 embodiment, a cash dispenser 216 is provided in the customer area 220 side of the in-line teller counter 200. For example, teller cash dispenser (TCD) 216 can be shared by customers “A” and “B.” A rotatable shield 224 can provide a visual and physical barrier between the dispensing portion of the TCD 216 and the customer not receiving cash from the TCD 216. For example, in FIG. 4, customer B receives cash from TCD 216, and the shield 224 is moved to a position where it acts as a barrier to customer A.

Alternatively, as shown in the FIG. 5 embodiment, a teller cash dispenser 222 may be provided on the teller area 210 side of the in-line teller counter 200. For example, teller cash dispenser (TCD) 222 can be shared by the tellers using the first and second teller stations (associated with teller displays 212 and 214, respectively). A rotatable shield 225 provided over the outlet of the TCD 222 may reduce or prevent teller error by allowing only the appropriate teller access to the TCD 222. In this alternative embodiment, openings 226 and 228 in partition 208, may allow the tellers to transfer cash and/or the like to the customers.

Figure 6:
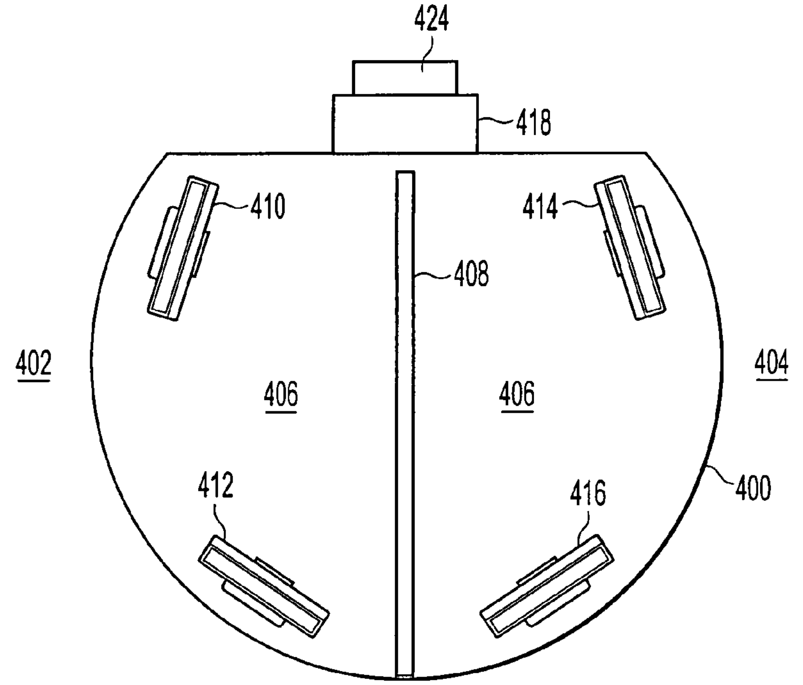
FIG. 6 is a top view of a stand-alone podium with two teller displays, two customer displays and a single cash dispensing/recycling machine in an exemplary embodiment that dispenses to tellers.
Figure 7:
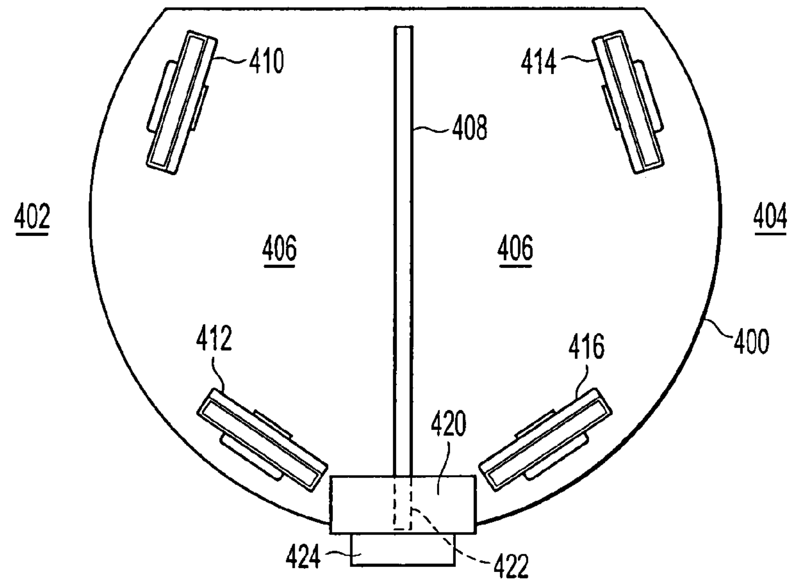
FIG. 7 is a top view of a stand-alone podium with two teller displays, two customer displays and a single cash dispensing/recycling machine in an exemplary embodiment that dispenses directly to customers.

FIGS. 6 and 7 illustrate exemplary embodiments of stand-alone podiums 400 around which both the teller and the customer can move. Some stand-alone podiums using a TCD are known in the art, and have been offered by De La Rue Cash Systems for a number of years. Some examples of banking arrangements including stand-alone podiums having a TCD can be seen, for example, in U.S. Pat. No. 6,681,985, the disclosure of which is incorporated herein by reference in its entirety.

The stand alone podiums 400 in the embodiments of FIGS. 6 and 7 have two teller stations, 402, 404. The podium 400 includes an upper surface 406 that is divided into two sections by a partition 408 so as to form two teller stations. This two-teller station type of stand-alone podium has been found to be very efficient and easy to incorporate into bank floor plans. The first teller station 402 includes a first teller display 410 and a first customer display 412 provided on one side of the partition 408. The second teller station 404 includes a second teller display 414 and a second customer display 416 provided on an other side of the partition 408. The displays 410, 412, 414 and 416 may be rotatable and the orientation of the various displays 410, 412, 414 and 416 can differ from the orientation shown in FIGS. 6 and 7. For example, the corresponding teller and customer displays can face in opposite directions (180° different from each other) instead of the orientations shown.

In the embodiment of FIG. 6, the two-teller station stand-alone podium 400 includes a TCD/R 418 that is shared by both of the tellers. The TCD/R 418 of podium 400 dispenses cash directly to the tellers to hand to the customers.

Alternatively, as shown in the embodiment of FIG. 7, the customers can directly access the cash via a TCD/R 420, which may be provided below an opening 422 in the partition 408. Alternatively, the TCD/R 420 may be provided at an end of the partition 408, as similarly shown with respect to the TCD/R 418.

The TCD/R 418, 420 each also include a drop box 424 into which the teller or customer can place a bundle (for example, an envelope) associated with a deposit. The drop box 424, when used with a teller cash dispenser (TCD), may allow for many kinds of deposits into drop box including cash deposits, check deposits, or any other bank type transaction documents, and the like. The drop box 424, when used with a teller cash recycler (TCR) would allow for deposits such as checks since cash and/or coins could be directly inserted into the TCR.

Figure 8:
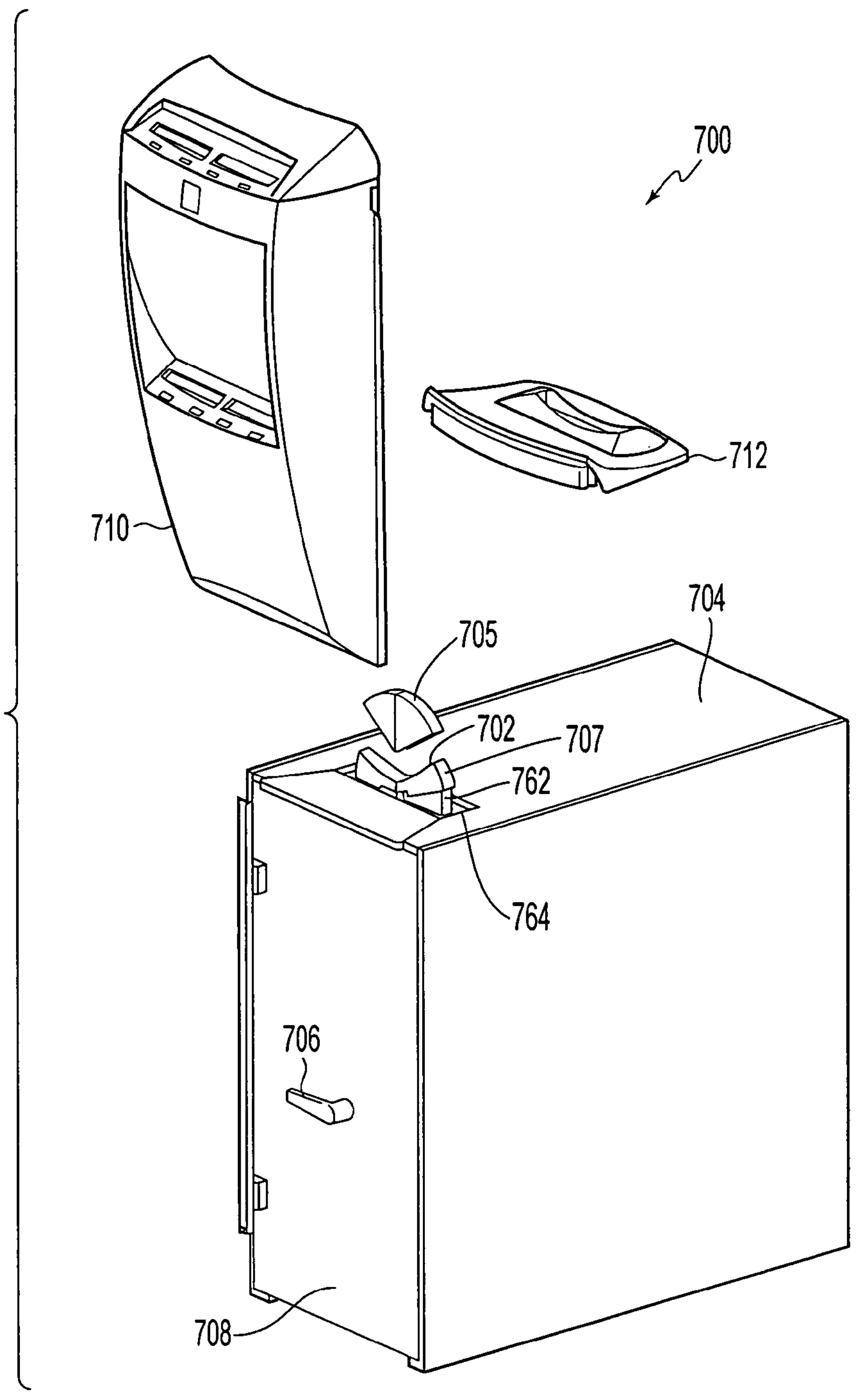
FIG. 8 PRIOR ART
FIG. 8 is an exploded perspective view of a cash dispensing/recycling machine in the prior art.
Figure 9:
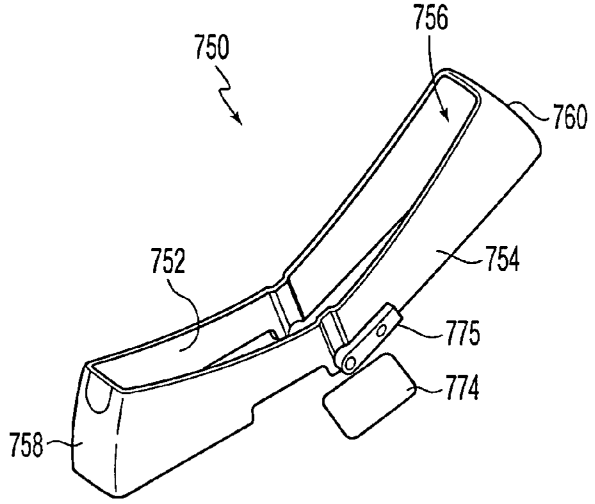
FIG. 9 is a perspective view of a cradle of a cash-dispensing portion of a cash dispensing/recycling machine in an exemplary embodiment.

The TCD/R of the above-described embodiments may have a dispenser for notes or the like that is configured to provide additional privacy and security. For example, referring to FIG. 8, an exploded view of a prior art TCD/R 700 is illustrated. A cash-dispensing portion 702 may be located on a top surface 704 of the TCD/R 700, as shown. An access 706 may be provided on a front door 708 of the TCD/R 700. An aesthetically-pleasing front cover 710 covers the front door 708. An aesthetically-pleasing top cover 712 may be provided over the cash-dispensing portion 702 on the top surface 704 of the TCD/R 700. The cash-dispensing portion 702 may be used to transfer cash, or other notes, or the like to customers and/or tellers. A cradle 707, provided in the cash-dispensing portion 702, has a shield 705. The shield 705 is provided on a top portion of the cradle 707 and provides some added perception of security by providing a visual barrier of the notes, or the like, and by preventing access to the cradle 707 through the shield 705. However, with this configuration, the cradle 707 is not locked and as such, an unauthorized user may move the cradle 707 to access notes, or the like, in the cradle 707, even when the shield 705 is provided. As discussed more fully below, a lock may be provided to lock the cradle and/or a different shield may be provided that prevents access to the cradle may be provided.

Referring to FIGS. 9-14, the cash-dispensing portion 702 may include a cradle 750. The cradle 750 may have two spaced apart walls 752 and 754 defining a passage or output slot 756. The cradle 750 may further have a first end 758 and a second end 760 on opposite sides of the cradle, further defining the passage 756. The cradle 750 may be attached to a base 762, which protrudes through an opening 764 in the top surface 704 of a TCD/R 800 (see FIG. 8). A lever 775 may be attached to the cradle 750 and may attach the cradle 750 to a protective shield, a locking mechanism, a housing for the cradle and/or element of the TCD/R 800. The lever 775 may cause the cradle 750 to rotate.

Figure 11:
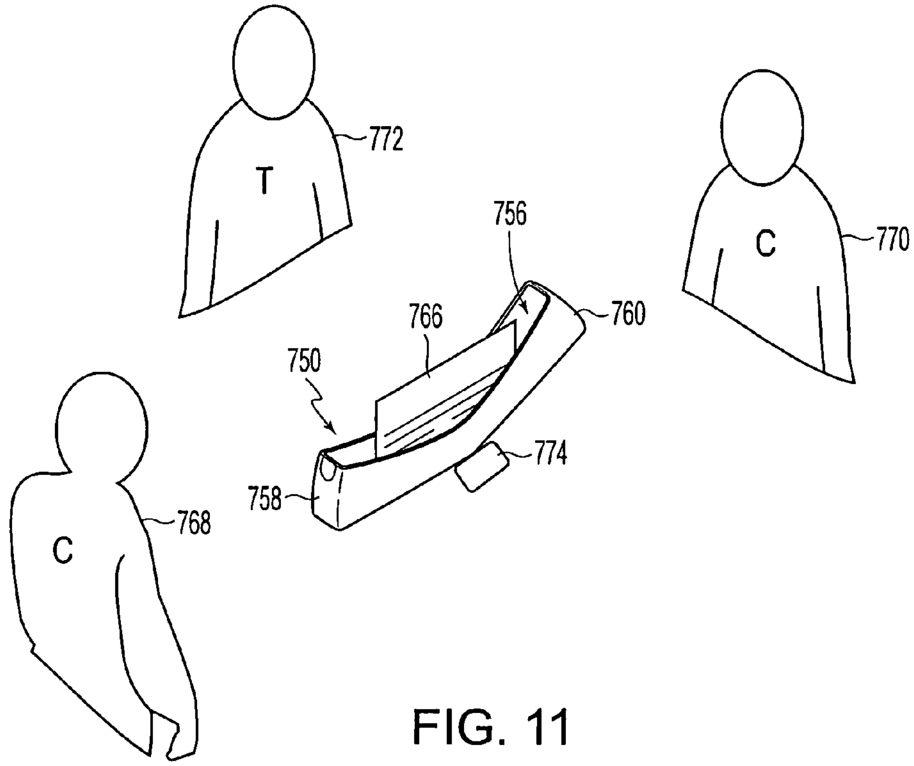
FIG. 11 is a perspective view of a cradle of a cash-dispensing portion of a cash dispensing/recycling machine showing a note being dispensed in an exemplary embodiment.
Figure 12:
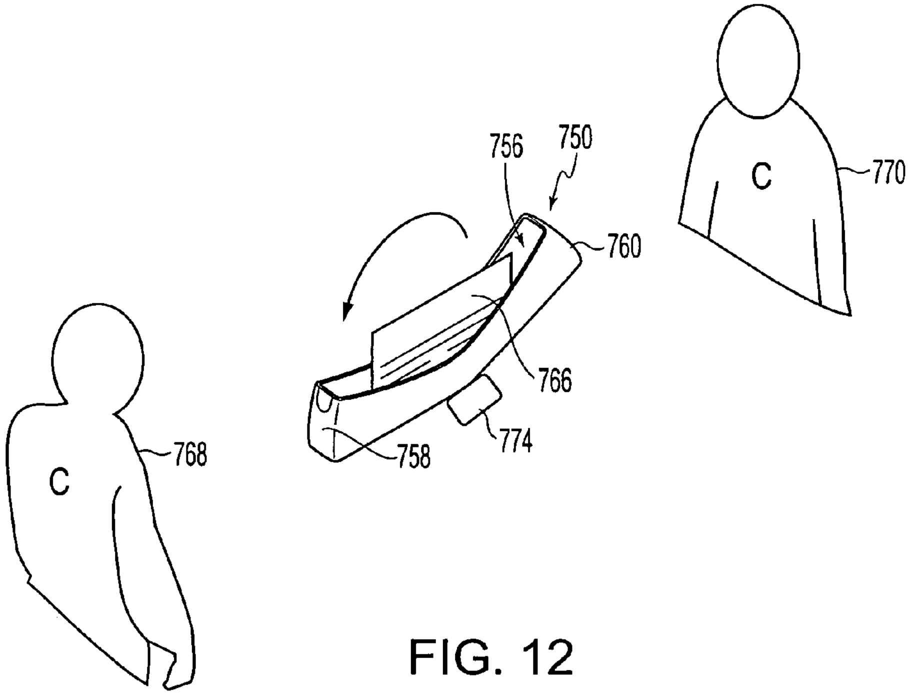
FIG. 12 is a perspective view of the FIG. 11 cradle rotated toward a first customer or teller.
Figure 13:
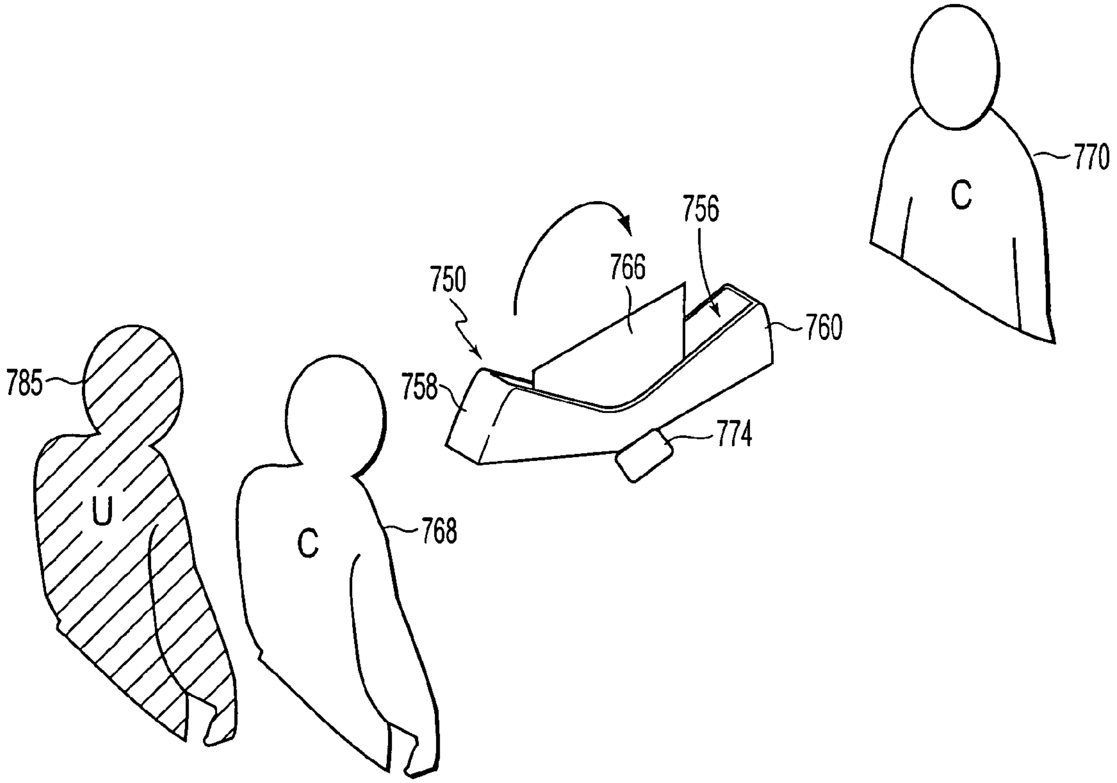
FIG. 13 is a perspective view of the FIG. 11 cradle rotated toward a second customer or teller.

Referring to FIGS. 11-13, cash and/or notes 766 and/or the like, may be ejected through the passage 756 for transfer to the customer or teller. The cradle 750 may rotate in the counter-clockwise direction about a center axis, as shown in FIG. 12, so that a customer 768 (or a teller) may receive the note 766 in the passage 756 via the first end 758 of the cradle 750. The cradle 750 may rotate in the clockwise direction about the center axis, as shown in FIG. 13, so that a customer 770 (or a teller) may receive the note 766 in the passage 756 via the second end 760 of the cradle 750.

Figure 10:
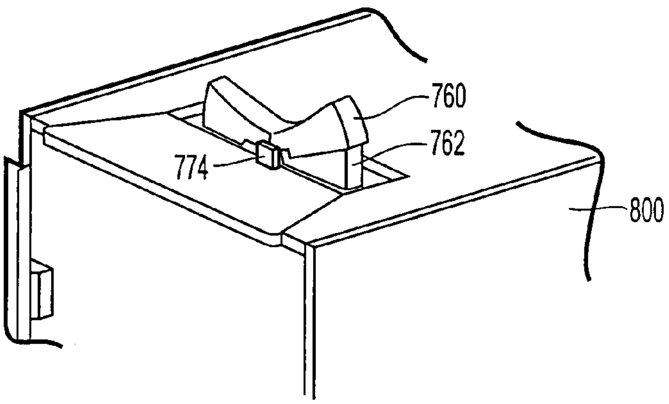
FIG. 10 is an end view of the FIG. 9 cradle.

As the cradle 750 rotates in the counter-clockwise direction, the second end 760 of the cradle 750 moves in an upward direction thereby providing a physical and visual barrier of the note 766 from the customer 770, as shown in FIG. 12. Similarly, rotating the cradle 750 in the clockwise direction results with the first end 758 of the cradle 750 moving in the upward direction, thereby providing a physical and visual barrier of the note 766 from the customer 768, as shown in FIG. 13. In addition to the first end 758 or the second end 760 providing a visual and physical barrier of the note 766, the base 762 of the cash-dispensing portion 702 further provides an additional barrier, as shown in FIG. 10. In an alternative embodiment, the cradle 750 is in a neutral position in which a teller may access the note 776, and both the first end 758 and the second end 760 may provide a visual and physical barrier to customers 768 and 770, as shown in FIG. 11.

A lock 774 on the cradle 750 may lock the cradle to prevent rotation of the cradle 750 in the clockwise direction or the counter-clockwise direction. For example, in the embodiment of FIG. 9 the lock 774 may be associated with the lever 775 that causes the cradle to rotate, or to rock back-and-forth. The lock 774 may lock or prevent the lever 775 from movement such that, for example, even if a downward force is applied to the first end 758 or the second end 760 of the cradle, the cradle 750 will not rotate or rock.

Figure 14:
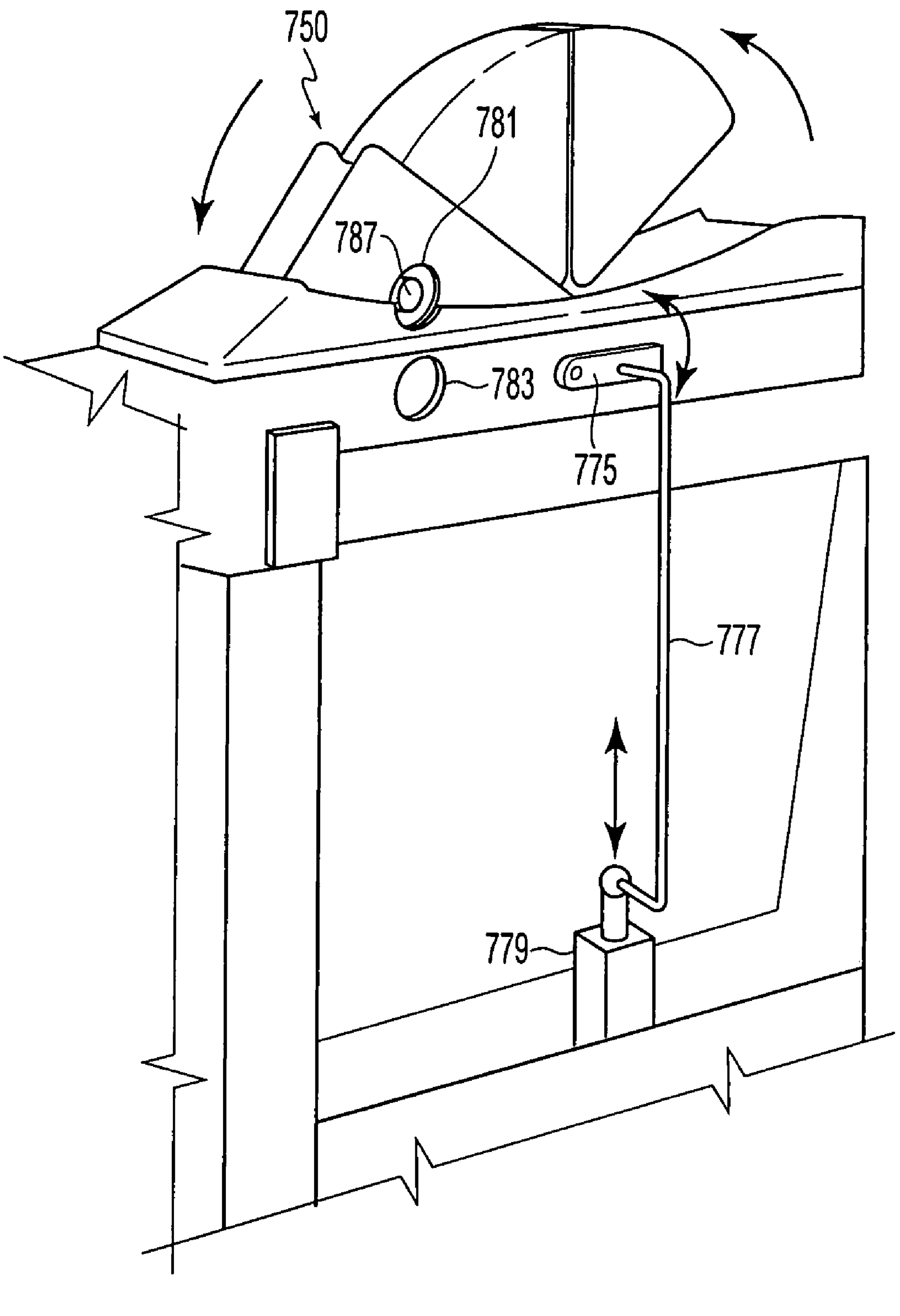
FIG. 14 is a perspective view of a cradle of a cash-dispensing portion of a cash dispensing/recycling machine including a locking mechanism in an exemplary embodiment.

Referring to FIG. 14, the lever 775, which is attached to the rotatable cradle 750, may be linked by a tie bar 777 to a solenoid 779 such that activation or de-activation of the solenoid 779 causes the tie bar 777 to move in an upward and/or downward direction, as shown by the vertical arrow. Moving the tie bar 777 in an upward and/or downward direction may cause the lever 775 to rotate the cradle 750 in a clockwise or counter-clockwise direction.

In an alternative embodiment, the solenoid 779 may insert a rod 787 into a first hole 781 in the cradle 750, thereby locking the cradle in a first dispense position, i.e., after rotation of the cradle 750 in a clockwise direction (see FIGS. 13 and 14). Alternatively, when the cradle 750 is rotated in a counter-clockwise direction, activation of the solenoid 779 will cause insertion of the rod 787 into a second hole 783 to lock the cradle 750 in a second position (see FIG. 12). When the solenoid is not activated, the cradle 750 may be free to move via the action of the solenoid.

Accordingly, an unauthorized person 785 is prevented from accessing cash and/or notes 766 being dispensed to a customer 770 or teller, as shown in the embodiment of FIG. 13 when the lock 774 is engaged.

Figure 15:
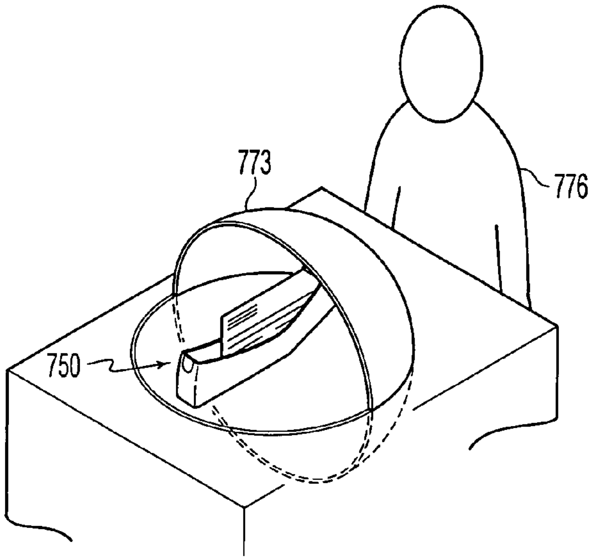
FIG. 15 is a perspective view of a cradle, with a protective shield rotated toward a first customer or teller, of a cash dispensing/recycling machine in an exemplary embodiment.
Figure 16:
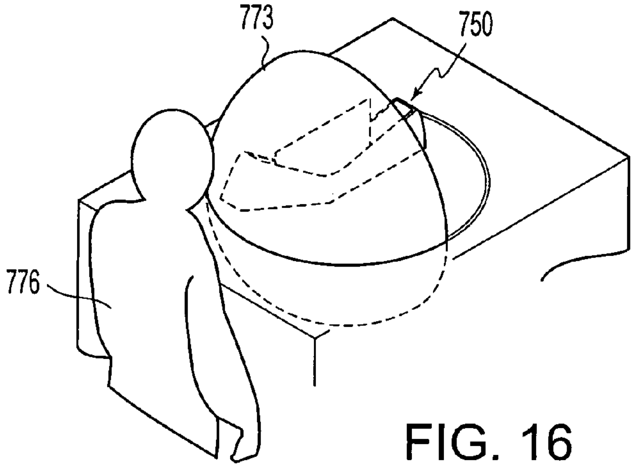
FIG. 16 is a perspective view of the FIG. 15 cradle, rotated toward a second customer or teller.

Referring to FIGS. 15 and 16, in addition to the base 762 and first end 758 and/or second end 760 of the cradle 750, and/or the lock 774, a shield 773 may be provided for additional security and privacy. The shield 773 may take the shape of a dome, cylinder, or the like. The shield 773 may rotate in the clockwise or counter-clockwise direction in order to block access and to provide a barrier to a customer or other person 776 who is not receiving cash from the TCD/R 700. The shield 773 may be opaque to provide a visual barrier.

Figure 17:
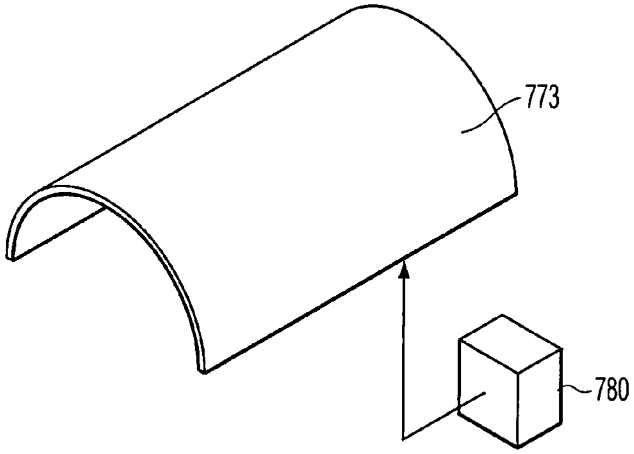
FIG. 17 is a perspective view of a shield for covering a cradle in an exemplary embodiment.

With reference to FIG. 17, the shield 773 may be attached to a mechanism 780, such as, for example, the lever 775 (see FIG. 9) or other structure, which may apply the needed force to rotate the shield 773. Alternatively, the mechanism 780 may act independently from the lever 775 or cradle 750, so that the shield 773 rotates independently of the cradle 750. Alternatively, the shield 773 and mechanism 780 may be linked to the cradle 750 so that the shield 773 can not rotate independently from the cradle 750.

It is envisioned that various inlet/outlet devices of various sizes and shapes may be used in order to dispense notes to more than one customer. It is further envisioned that a number of protective shields may be used to cover, or partially cover the inlet/outlet devices in order to provide additional security and privacy to the customer.

Furthermore, in an exemplary embodiment, a TCD/R (not shown) may be designed to fit under a counter, in a podium, in a wall, as a stand-alone, or the like. The TCD/R may be compact in size so that it may easily fit under a counter or be integrated into bank furniture, and be able to support standing or seated operation. A lock may be provided on a front or rear face of the TCD/R to provide added security.

Figure 18A:
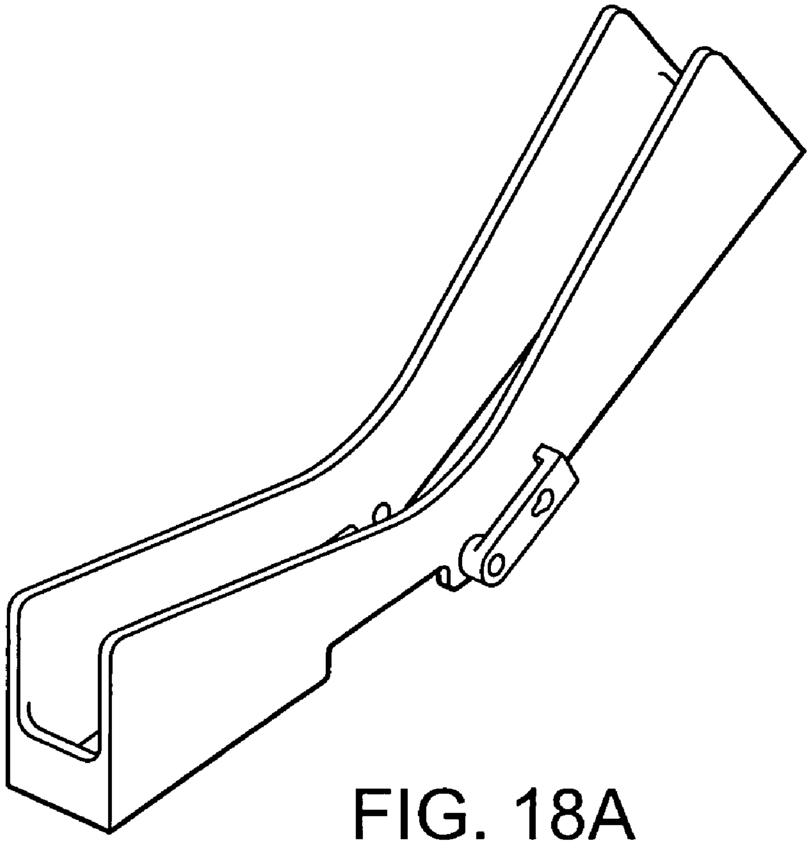
FIG. 18A RELATED ART
FIG. 18 is a perspective view of a prior art cradle of a cash dispensing machine.
Figure 18B:
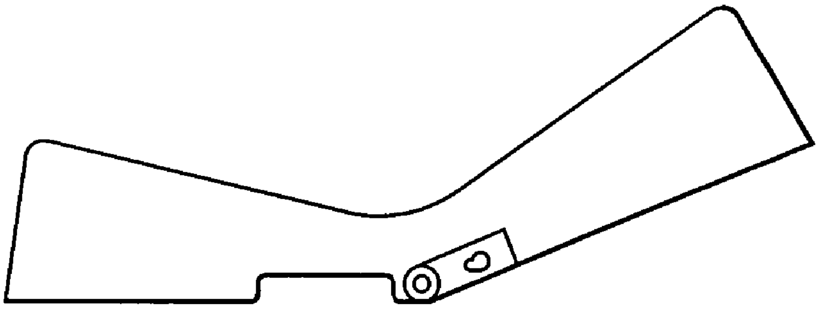
FIG. 18B RELATED ART

A prior art cradle, as shown in FIG. 18 may also be incorporated into the TCD/R of the exemplary embodiments. The prior art cradle does not lock in position, but rather is rotatable such that a person applying pressure to either side of the cradle may force rotation of the cradle. Such a prior art cradle may be installed or incorporated into the TCD/R of some of the exemplary embodiments. The shield 773 could provide visual and physical barriers to the prior art cradle, and the lock 774 may also provide additional security, as described above.

While the invention has been described with reference to preferred embodiments thereof, it is to be understood that the invention is not limited to the preferred embodiments or constructions. The invention is intended to cover various modifications and equivalent arrangements. In addition, while the various elements of the preferred embodiments are shown in various combinations and configurations, which are exemplary, other combinations and configurations, including more, less or only a single element, also are within the spirit and scope of the invention.

What is claimed is:

1. A cash dispenser, comprising:

a housing;

a cradle protruding from the housing, the cradle having a first end, a second end, and two spaced apart walls defining a passage arranged to receive dispensed notes, wherein the cradle is rotatable about a rotational-axis so as to selectively receive dispensed notes in one of a first direction and a second direction; and a cover disposed over the cradle, wherein the cover is movable at least between a first position in which the second end of the cradle is covered and a second position in which the first end of the cradle is covered, the cover moving to the first position or the second position based on whether the cradle is receiving dispensed notes in the first direction or in the second direction.

2. The cash dispenser of claim 1, wherein the cover is movable dependent on the rotation of the cradle.

3. The cash dispenser of claim 1, wherein the dispensed notes are received by a first user from the first end and dispensed notes are received by a second user from the second end of the cradle.

4. The cash dispenser of claim 3, wherein the cover prevents the first user from accessing the notes in the passage at the second end of the cradle, and wherein the cover prevents the second user from accessing the notes in the passage at the first end of the cradle.

5. The cash dispenser of claim 1, wherein the cover is integrally formed with the cradle and rotates about the rotational-axis with the cradle.

6. The cash dispenser of claim 1, wherein the cover is rotatable about the rotational-axis and rotates independently from the cradle.

7. The cash dispenser of claim 1, wherein the cover rotates about the rotational-axis in a first direction to provide a barrier to the notes in the passage at the second end of the cradle while providing access to the notes in the passage at the first end of the cradle, and wherein the cover rotates about the rotational-axis in a second direction to provide a barrier to the notes in the passage at the first end of the cradle while providing access to the notes in the passage at the second end of the cradle.

8. The cash dispenser of claim 1, wherein the cover is opaque.

9. The cash dispenser of claim 1, further comprising:

a lock to prevent rotation of the cradle about the rotational-axis.

10. A cash dispenser, comprising:

a cradle having two spaced apart walls defining a passage arranged to receive dispensed notes, wherein the cradle is rotatable about a rotational-axis; and a lock to prevent rotation of the cradle about the rotational-axis;

a lever attached to the cradle;

a solenoid; and a tie bar linking the solenoid to the lever, wherein the solenoid causes movement of the tie bar to force the cradle to rotate.

11. The cash dispenser of claim 10, further comprising:

a rod associated with the solenoid;

a first hole in the cradle, wherein the rod is inserted into the first hole to lock the cradle in a first position.

12. The cash dispenser of claim 11, further comprising:

a second hole in the cradle, wherein the rod is inserted into the second hole to lock the cradle in a second position.

13. A cash dispenser, comprising:

a cradle having two spaced apart walls defining a passage arranged to receive dispensed notes, wherein the cradle is rotatable about a rotational-axis;

a lock to prevent rotation of the cradle about the rotational-axis; and a shield over the cradle to prevent unauthorized access to the cradle.

14. The cash dispenser of claim 13, wherein the shield rotates about the rotational-axis independently from the rotation of the cradle.

15. The cash dispenser of claim 13, wherein the shield is integrally formed with the cradle and is movable with the rotation of the cradle.

16. The cash dispenser of claim 15, wherein the lock prevents both the cradle and the shield from rotating.

17. A cash dispenser, comprising:

a rotatable cash-dispensing cradle that rotates about a rotational axis to selectively dispense notes in one of (i) a first direction when located at a first rotational position, and (ii) a second direction when located at a second rotational position; and security means for inhibiting access to the cradle from the second direction when the cradle is located at the first rotational position, and for inhibiting access to the cradle from the first direction when the cradle is located at the second rotational positions.

* * * * *